(12) United States Patent
Mann, III et al.

(10) Patent No.: US 10,533,668 B2
(45) Date of Patent: Jan. 14, 2020

(54) SEAL ASSEMBLIES FOR USE WITH FLUID VALVES

(71) Applicant: Fisher Controls International LLC, Marshalltown, IA (US)

(72) Inventors: J. Adin Mann, III, Ames, IA (US); Shawn William Anderson, Haverhill, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 109 days.

(21) Appl. No.: 15/336,585

(22) Filed: Oct. 27, 2016

(65) Prior Publication Data
US 2017/0045147 A1    Feb. 16, 2017

Related U.S. Application Data

(63) Continuation of application No. 13/920,730, filed on Jun. 18, 2013, now Pat. No. 9,512,934.

(51) Int. Cl.
*F16K 3/24* (2006.01)
*F16K 41/00* (2006.01)
(Continued)

(52) U.S. Cl.
CPC .............. *F16K 3/243* (2013.01); *F16J 15/166* (2013.01); *F16J 15/3236* (2013.01);
(Continued)

(58) Field of Classification Search
CPC ... F16K 3/22; F16K 3/24; F16K 3/243; F16K 3/246; F16K 3/26; F16K 3/262;
(Continued)

(56) References Cited

U.S. PATENT DOCUMENTS 989,177 A    4/1911   Montgomery
2,217,835 A  10/1940  Corbin, Jr.
(Continued)

FOREIGN PATENT DOCUMENTS

DE    802488    2/1951
EP    0308390   3/1989
GB    2181191   4/1987

OTHER PUBLICATIONS

Patent Cooperation Treaty, "International Preliminary Report on Patentability," issued in connection with PCT Patent Application No. PCT/US2014/042868, dated Dec. 22, 2015, 7 pages.
(Continued)

*Primary Examiner* — Reinaldo Sanchez-Medina
*Assistant Examiner* — Hailey K. Do
(74) *Attorney, Agent, or Firm* — Hanley, Flight & Zimmerman, LLC

(57) ABSTRACT

Seal assemblies for use with fluid valves are described. An example apparatus includes a cage; a plug including a seal gland; and means for sealingly engaging an inner surface of the cage at least partially positioned in the seal gland and including a first portion and a second portion, in response to a fluid acting on the first portion in a first direction, the first portion to engage, outwardly urge, and splay the second portion to sealingly engage the cage, in response to the fluid acting in a second direction, the second portion to deter the fluid from acting on the first portion, the first direction opposite the second direction.

21 Claims, 3 Drawing Sheets

(51) Int. Cl.
*F16J 15/16* (2006.01)
*F16J 15/3236* (2016.01)
*F16J 15/3252* (2016.01)

(52) U.S. Cl.
CPC ......... F16J 15/3252 (2013.01); F16K 41/003 (2013.01); *Y10T 137/598* (2015.04); *Y10T 137/599* (2015.04)

(58) Field of Classification Search
CPC .......... F16K 3/265; F16K 3/267; F16K 41/00; F16K 41/046; F16K 5/0673; F16J 15/3236; F16J 15/3208; F16J 15/166; F16J 15/3204
USPC ........ 251/324, 325, 358; 277/309, 310, 327, 277/396, 406, 434–442, 467, 500, 510, 277/511, 529–535, 538, 539, 541; 384/905.1, 28, 29, 32
See application file for complete search history.

(56) References Cited

U.S. PATENT DOCUMENTS

| | | | |
|---|---|---|---|
| 2,392,182 A | | 1/1946 | Payne |
| 2,595,926 A | * | 5/1952 | Chambers, Jr. .......... F16J 15/38 277/385 |
| 3,372,904 A | | 3/1968 | Graham et al. |
| 3,506,275 A | | 4/1970 | Moriyama |
| 4,083,380 A | | 4/1978 | Huber |
| 4,178,020 A | * | 12/1979 | Dopyera ............... F16L 37/002 277/607 |
| 4,300,776 A | | 11/1981 | Taubenmann |
| 4,410,189 A | * | 10/1983 | Myers .................. F16J 15/3236 277/530 |
| 4,462,568 A | | 7/1984 | Taylor et al. |
| 4,706,970 A | | 11/1987 | Ramirez |
| 4,712,769 A | | 12/1987 | Johnson |
| 4,862,915 A | | 9/1989 | Renfro |
| 5,997,003 A | | 12/1999 | Turner |
| 6,367,803 B1 | | 4/2002 | Loth |
| 6,807,985 B2 | | 10/2004 | Stares et al. |
| 7,195,246 B2 | * | 3/2007 | Aoshiba ............... F16J 15/3208 277/438 |
| 7,428,912 B2 | | 9/2008 | Pozzati |
| 8,622,142 B2 | | 1/2014 | Shaw |
| 2005/0000577 A1 | * | 1/2005 | Alman ..................... F16K 1/36 137/625.33 |
| 2007/0075503 A1 | * | 4/2007 | Hayashi ................. F16J 15/104 277/589 |
| 2010/0270491 A1 | | 10/2010 | Faas |
| 2011/0180275 A1 | | 7/2011 | Shaw |
| 2014/0366959 A1 | | 12/2014 | Mann, III et al. |

OTHER PUBLICATIONS

Patent Cooperation Treaty, "International Search Report," issued in connection with PCT Patent Application No. PCT/US2014/042868, dated Oct. 10, 2014, 5 pages.

Patent Cooperation Treaty, "Written Opinion," issued in connection with PCT Patent Application No. PCT/US2014/042868, dated Oct. 10, 2014, 6 pages.

United States Patent and Trademark Office, "Notice of Allowance," issued in connection with U.S. Appl. No. 13/920,730, dated Aug. 22, 2016, 14 pages.

United States Patent and Trademark Office, "Final Office Action," issued in connection with U.S. Appl. No. 13/920,730, dated Jul. 5, 2016, 27 pages.

United States Patent and Trademark Office, "Non-Final Office Action," issued in connection with U.S. Appl. No. 13/920,730, dated Dec. 31, 2015, 18 pages.

United States Patent and Trademark Office, "Advisory Action," issued in connection with U.S. Appl. No. 13/920,730, dated Nov. 5, 2015, 5 pages.

United States Patent and Trademark Office, "Final Office Action," issued in connection with U.S. Appl. No. 13/920,730, dated Jul. 7, 2015, 20 pages.

United States Patent and Trademark Office, "Non-Final Office Action," issued in connection with U.S. Appl. No. 13/920,730, dated Jan. 16, 2015, 25 pages.

* cited by examiner

SEAL ASSEMBLIES FOR USE WITH FLUID VALVES

RELATED APPLICATION

This patent arises from a continuation of U.S. patent application Ser. No. 13/920,730, which was filed on Jun. 18, 2013. Priority is claimed to U.S. patent application Ser. No. 13/920,730. U.S. patent application Ser. No. 13/920,730 is incorporated herein by reference in its entirety.

FIELD OF THE DISCLOSURE

This patent relates generally to seal assemblies and, more particularly, to seal assemblies for use with fluid valves.

BACKGROUND

Control valves are commonly used in process plants to control the flow of fluid (e.g., a gas, a liquid, etc.) or any other substance through pipes and/or vessels to which they are connected. A control valve is typically composed of one or more inlets and outlets and includes a flow control element or member (e.g., a valve gate, a piston, a valve plug, a closure member, etc.) that operates to control fluid flow through apertures that fluidly couple the inlet(s) to the outlet(s).

SUMMARY

An example apparatus includes a cage; a plug including a seal gland; and means for sealingly engaging an inner surface of the cage at least partially positioned in the seal gland and including a first portion and a second portion, in response to a fluid acting on the first portion in a first direction, the first portion to engage, outwardly urge, and splay the second portion to sealingly engage the cage, in response to the fluid acting in a second direction, the second portion to deter the fluid from acting on the first portion, the first direction opposite the second direction.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to seal assemblies for use with valves (e.g., flow-up valves, flow-down valves) that sealingly engage a dynamic sealing surface of a cage and/or a valve plug. The seal assemblies may at least partially surround the valve plug and include a housing, an annular portion and/or jacket defining a groove in which a flexible core is at least partially positioned. In some examples, the jacket is made of and/or includes relatively thin stainless steel (e.g., 0.004 inches) and the flexible core is made of and/or includes flexible graphite. While stainless steel is mentioned as an example material used to make the jacket, any other material such as an Inconel alloy may be used.

To enable the seal (e.g., the housing, the core) to be outwardly urged and to sealingly engage the dynamic sealing surface, the core defines a wedge-shaped groove that receives a wedge and/or protrusion of a back-up ring. In practice, pressure on the back-up ring urges the wedge into the wedge-shaped groove and outwardly urges and/or radially expands the seal into sealing engagement with the dynamic sealing surface. Such engagement between the seal and the cage and, specifically, between the housing and the cage substantially prevents fluid from leaking therebetween. In some examples, to reduce the frictional load on the plug and wear during throttling conditions, a biasing element and/or spring is positioned between the core and the back-up ring to urge the protrusion away from the groove when the pressure acting on the back-up ring is below a particular threshold. The biasing element and/or spring may be Belleville washers or coil springs.

Figure 1:
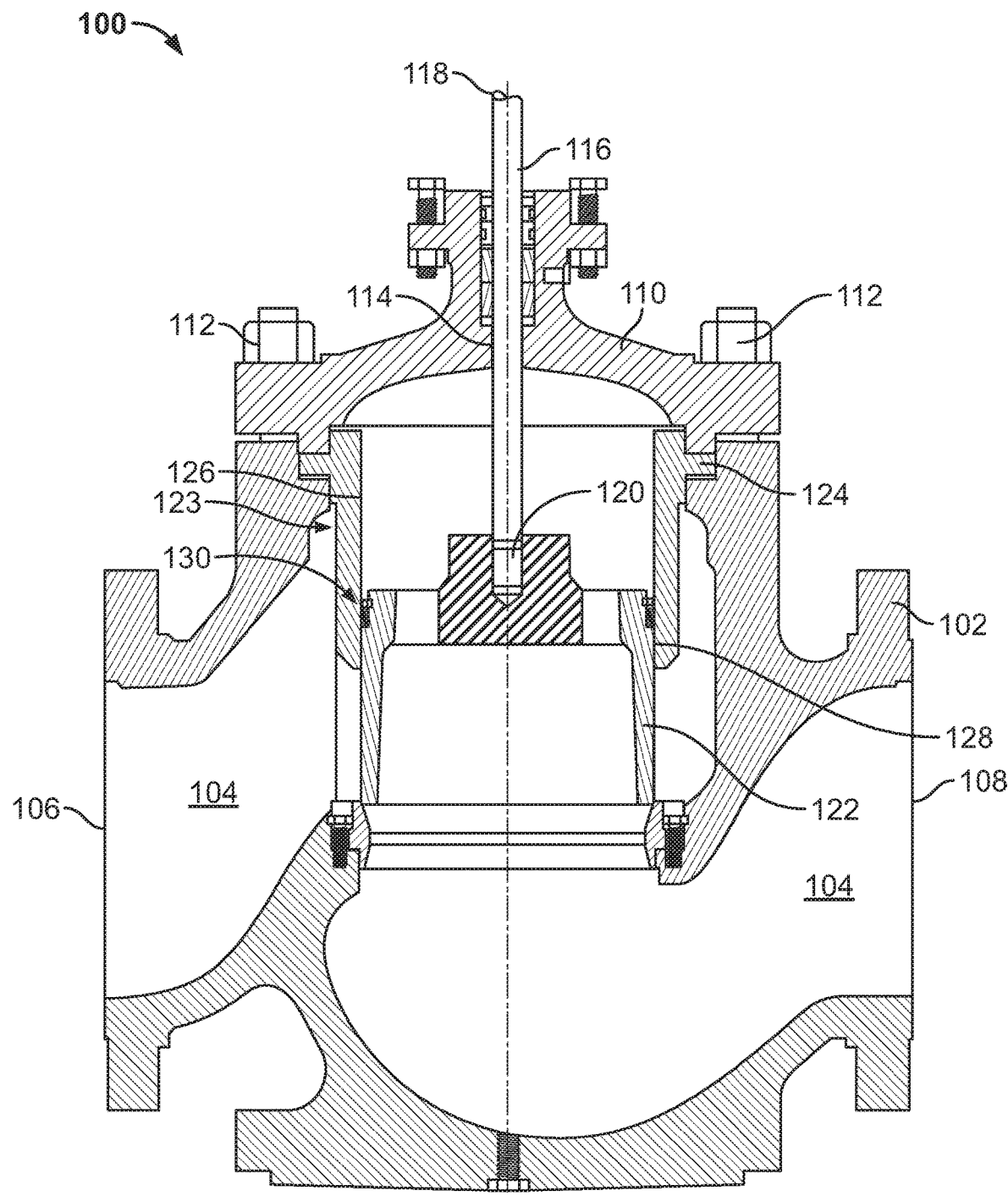
FIG. 1 depicts a known fluid valve having a known seal assembly.

FIG. 1 depicts a known fluid valve 100 that has a valve body 102 including a fluid flow passageway 104 between an inlet 106 and an outlet 108. A bonnet 110 is coupled to the valve body 102 via a plurality of fasteners 112 and includes a bore 114 to receive a stem 116. An end 118 of the stem 116 extends from the bonnet 110 and is operatively coupled to an actuator, and an opposite end 120 of the stem 116 is coupled to a fluid control element or plug (e.g., a pressure balanced plug) 122.

To control fluid flow through the valve body 102, valve trim 123 is positioned between the inlet 106 and the outlet 108 to provide certain flow characteristics (e.g., to reduce noise and/or cavitation generated by the flow of fluid through the fluid valve 100). In this example, the valve trim 123 includes a hanging cage 124, the plug 122 and the stem 116.

Figure 2:
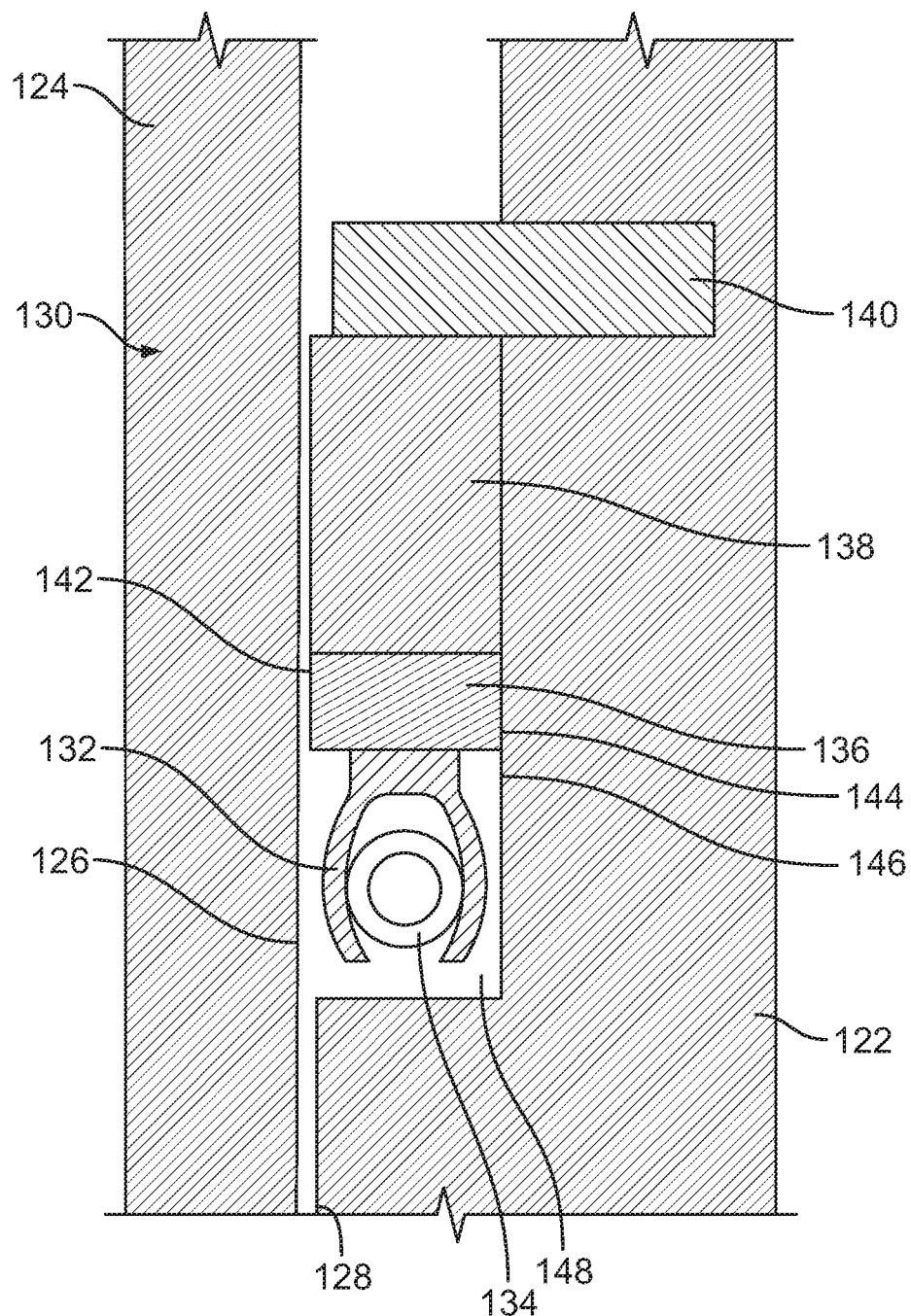
FIG. 2 depicts an enlarged view of the known seal assembly of FIG. 1.

To prevent fluid leakage between an inner surface or dynamic sealing surface 126 of the cage 124 and an outer surface 128 of the plug 122, the plug 122 is provided with a seal assembly 130 (shown most clearly in FIG. 2). Turning now to FIG. 2, the seal assembly 130 includes a back-up ring 136, a support ring 138, a retainer 140 and a seal 132 that at least partially surrounds a spring (e.g., a helical spring) 134.

Once the valve trim 123 is positioned in the fluid valve 100, the seal 132 is urged to engage the dynamic sealing surface 126 via the spring 134 to substantially prevent leakage between the surfaces 126 and 128. Additionally, when the fluid valve 100 is pressurized, the seal 132 loads the back-up ring 136 such that an outer edge 142 of the back-up ring 136 engages the dynamic sealing surface 126 and an inner edge 144 of the back-up ring 136 engages a surface 146 of a seal gland 148 in which the seal 132 is at least partially positioned.

Figure 3:
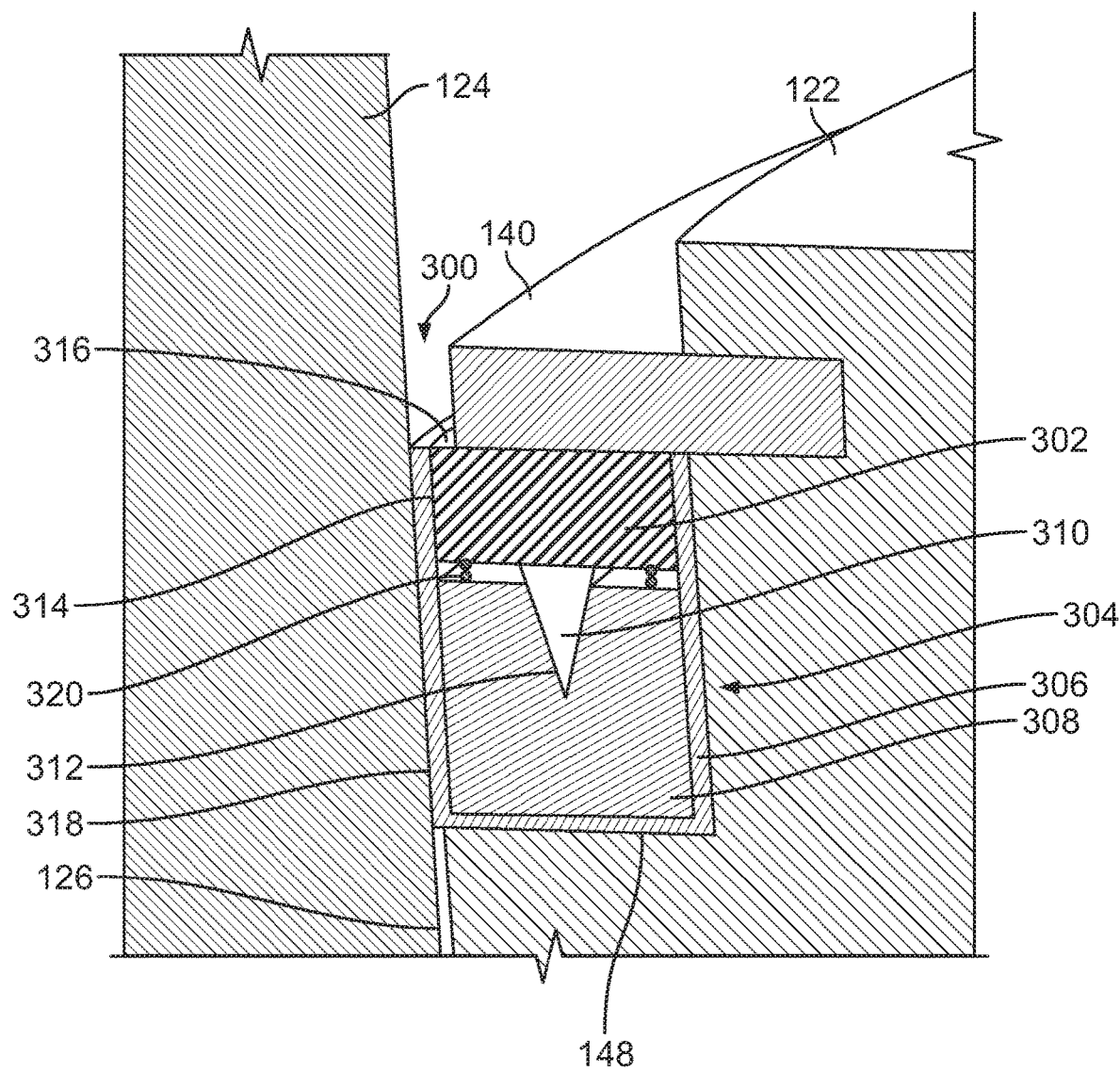
FIG. 3 depicts an example seal assembly that can be used to implement the examples disclosed herein.

FIG. 3 depicts an example seal assembly 300 that can be used to implement the examples disclosed herein. In this example, the seal assembly 300 includes the retainer 140, an example back-up ring and/or male portion 302 and an example seal and/or female portion 304. In some examples, the seal 304 includes a housing and/or annular portion 306 in which a core 308 and the back-up ring 302 are at least partially positioned. Positioning the core 308 within the housing 306 at least partially protects the core 308 from damage and/or erosion and enables the hardened wear resistant housing 306 instead of the core 308 to sealingly engage the cage 124. In some examples, the core 308 is made of graphite and the housing 306 is made of stainless steel.

To enable the back-up ring 302 to load the seal 304, in this example, the back-up ring 302 includes a tapered, wedge-shaped annular protrusion and/or projection 310 that is at least partially receivable within a tapered and/or wedge-shaped annular groove 312 of the core 308. In some examples, the projection 310 forms an angle of between about 15 degrees and 45 degrees. In some examples, as the back-up ring 302 moves relative to the core 308, the back-up ring 302 slidably engages and/or is guided by inner surfaces 314 of the housing 306.

In operation, when the fluid valve 100 is pressurized, the pressure acts on a surface 316 of the back-up ring 302, which urges the back-up ring 302 and the projection 310 toward the groove 312. The receipt of the projection 310 within the groove 312 loads the seal 304 such that an outer surface and/or edge 318 of the housing 306 sealingly engages the dynamic sealing surface 126. In some examples, to reduce the frictional load between the housing 306 and the cage 124 during throttling conditions, a biasing element and/or spring 320 is positioned between the core 308 and the back-up ring 302. The spring 320 urges the projection 310 from the groove 312 when the pressure acting on the surface 314 of the back-up ring 302 is below a particular threshold.

While the example seal assembly 300 is shown as being used with a flow-up valve, the seal assembly 300 may be used with flow-down valves. In such examples, the seal assembly 300 may be rotated 180 degrees from what is shown in FIG. 3 and the retainer 140 may not be used. However, in some such examples, the seal assembly 300 may include a seal retainer different from or similar to the seal retainer 140.

As set forth herein, an example apparatus includes a cage, a plug having a seal gland and a seal assembly to be at least partially positioned in the seal gland. The seal assembly includes a back-up ring having a tapered protrusion and a seal defining a groove to receive the protrusion. A pressure is to act on the back-up ring to urge the protrusion into the groove. An engagement between the protrusion and the groove is to urge the seal into sealing engagement with an inner surface of the cage. In some examples, the seal includes a core at least partially surrounded by an annular housing. In some examples, the housing is stainless steel.

In some examples, the housing is U-shaped. In some examples, the back-up ring is at least partially positioned within the annular housing. In some examples, inner surfaces of the housing guide the movement of the back-up ring. In some examples, the housing is positioned between the core and the inner surface of the cage. In some examples, the tapered protrusion is wedge-shaped. In some examples, the core is graphite (e.g., flexible graphite). In some examples, the apparatus includes a spring positioned between the back-up ring and the core to urge the back-up ring away from the core. In some examples, the groove is wedge-shaped.

Another example apparatus includes a cage, a plug having a seal gland and a seal assembly to be at least partially positioned in the seal gland. The seal assembly includes a male portion and a female portion to receive the male portion to urge the female portion into sealing engagement with an inner surface of the cage. In some examples, the male portion is a wedged-shaped protrusion of a back-up ring. In some examples, the female portion is a seal. In some examples, the seal includes a core at least partially surrounded by a housing. In some examples, the core includes graphite and the annular portion is stainless steel. In some examples, inner surfaces of the housing at least partially guide the movement of the back-up ring. In some examples, the housing is an annular housing. In some examples, the apparatus also includes a spring positioned between the core and the back-up ring to urge the back-up ring away from the core.

Another example apparatus includes a cage, a plug having a seal gland and means for sealingly engaging an inner surface of the cage at least partially positioned in the seal gland and including a first portion to engage and urge a second portion to sealingly engage the cage. In some examples, the first portion is a back-up ring having a tapered protrusion and the second portion is a seal defining a groove to receive the protrusion.

An example apparatus includes a cage; a plug comprising a seal gland; a retainer coupled to the plug; and a seal assembly to be at least partially positioned in the seal gland, the retainer to retain the seal assembly within the seal gland, the seal assembly, comprising: an annular housing; a back-up ring comprising a protrusion, an interaction between the back-up ring and the annular housing to guide movement of the back-up ring relative to the annular housing; a seal defining a groove to receive the protrusion, a fluid pressure to act on the back-up ring to urge the protrusion to move into the groove, an engagement between the protrusion and the groove to outwardly urge and splay the annular housing, via the seal, into sealing engagement with an inner surface of the cage; and a spring to urge the back-up ring away from the seal and to urge the protrusion out of the groove, the spring to act directly on the back-up ring and to be spaced from the protrusion.

In some examples, the seal comprises graphite. In some examples, the groove is wedge-shaped, a shape of a cross-section of the wedge-shaped groove corresponding to a cross-section of the protrusion. In some examples, the retainer is to engage an edge of the annular housing to retain the annular housing within the seal gland. In some examples, the seal assembly is a unidirectional seal assembly. In some examples, the retainer is to engage a surface of the back-up ring to retain the back-up ring within the seal gland. (Previously Presented) The apparatus of claim 10, wherein the seal comprises a core at least partially surrounded by the annular housing, the annular housing to deter erosion of or damage to the core. In some examples, the annular housing comprises stainless steel. In some examples, the annular housing includes a U-shaped groove to receive the seal, the seal having a shape corresponding to the groove.

An example apparatus includes a cage; a plug comprising a seal gland; a retainer coupled to the plug; a seal assembly to be at least partially positioned in the seal gland, the retainer to retain the seal assembly within the seal gland, the seal assembly, including an annular housing; a back-up ring comprising a protrusion, an interaction between the back-up ring and the annular housing to guide movement of the back-up ring relative to the annular housing; a seal defining a groove to receive the protrusion, a fluid pressure to act on the back-up ring to urge the protrusion to move into the groove, an engagement between the protrusion and the groove to outwardly urge and splay the annular housing, via the seal, into sealing engagement with an inner surface of the cage; and a spring to urge the back-up ring away from the seal, the spring disposed outside of the groove to enable the protrusion to move unimpeded within the groove.

In some examples, the seal comprises a core at least partially surrounded by the annular housing, the annular housing to deter erosion of or damage to the core. In some examples, the annular housing comprises stainless steel. In some examples, the annular housing includes a U-shaped groove to receive the seal, the seal having a shape corresponding to the groove. In some examples, the seal comprises graphite. In some examples, the groove is wedge-shaped, a shape of a cross-section of the wedge-shaped groove corresponding to a cross-section of the protrusion. In some examples, the retainer is to engage an edge of the annular housing to retain the housing within the seal gland. In some examples, the seal assembly is a unidirectional seal. In some examples, the retainer is to engage a surface of the back-up ring to retain the back-up ring within the seal gland.

An example apparatus includes a cage; a plug including a seal gland; a retainer coupled to the plug; a seal disposed within the seal gland, the seal having an aperture facing the retainer, the seal confined between the retainer and a surface of the seal gland opposite the retainer; a back-up ring including a tapered protrusion, the tapered protrusion extending into the aperture, a fluid to act on a first surface of the back-up ring to urge the tapered protrusion to move into the aperture and toward a first position, an engagement between the tapered protrusion and the aperture to outwardly urge and splay the seal into sealing engagement with an inner surface of the cage; and a spring disposed in a spring chamber defined between the back-up ring and the seal, the spring to act on the back-up ring to urge the tapered protrusion to move out of the aperture and toward a second position opposite the first position, the spring not disposed in the aperture.

Although certain example apparatus have been described herein, the scope of coverage of this patent is not limited thereto. On the contrary, this patent covers all apparatus fairly falling within the scope of the appended claims either literally or under the doctrine of equivalents.

What is claimed is:

1. An apparatus, comprising:
   a cage;
   a plug including a seal gland, wherein the plug is configured to move relative to the cage;
   a retainer coupled to the plug;
   a seal disposed within the seal gland, the seal including a housing and a core, the housing having a u-shaped or c-shaped cross-section defining a first aperture, the core disposed in the first aperture of the housing, the core having a second aperture, the seal confined between the retainer and a surface of the seal gland opposite the retainer; and
   a back-up ring disposed within the first aperture, the back-up ring including a tapered protrusion extending into the second aperture, a fluid to act on a first surface of the back-up ring to urge the tapered protrusion to move into the second aperture, an engagement between the tapered protrusion and the second aperture to outwardly urge and splay the seal into sealing engagement with an inner surface of the cage, the back-up ring being disposed within the first aperture to deter the fluid from acting on a second surface of the back-up ring, the first surface opposite the second surface.

2. The apparatus of claim 1, wherein an interaction between the back-up ring and the seal is to guide movement of the back-up ring relative to the seal.

3. The apparatus of claim 1, wherein housing is to deter erosion of or damage to the core.

4. The apparatus of claim 1, wherein the housing is constructed of a first material and the core is constructed of a second material different than the first material.

5. The apparatus of claim 1, wherein the first aperture and the second aperture have respective openings facing the retainer, and wherein a first end of the housing defining the first aperture is engaged with the retainer.

6. The apparatus of claim 1, wherein the back-up ring includes a first portion, the tapered protrusion extending from the first portion, the first portion being slidably engaged with inner surfaces of the housing.

7. The apparatus of claim 1, further including a spring to urge the back-up ring away from the seal.

8. The apparatus of claim 7, wherein the spring is to surround the tapered protrusion.

9. An apparatus, comprising:
   a cage;
   a plug including a seal gland, wherein the plug is configured to move relative to the cage;
   a retainer coupled to the plug;
   a housing disposed within the seal gland, the housing having a u-shaped or c-shaped cross-section defining an opening, the retainer to engage an end of the housing defining the opening to retain the housing within the seal gland;
   a back-up ring including a tapered protrusion, the back-up ring disposed within the housing, an interaction between an exterior surface of the back-up ring and an interior surface of the housing to guide movement of the back-up ring within the housing between a first position and a second position; and
   a core defining a groove to receive the tapered protrusion, the core disposed within the housing, a fluid to act on the back-up ring to urge the tapered protrusion to move into the groove and to position the back-up ring in the first position, in the first position, the tapered protrusion being further within the groove than in the second position, an engagement between the tapered protrusion and the groove to outwardly urge and splay the housing, via the core, into sealing engagement with an inner surface of the cage.

10. The apparatus of claim 9, further including means for urging the back-up ring toward the second position.

11. An apparatus, comprising:
    a cage;
    a plug including a seal gland, wherein the plug is configured to move relative to the cage; and
    a seal, including:
        a male portion including a back-up ring; and
        a female portion, the female portion having a channel formed by an opening in a first end of the female portion, the male portion disposed entirely within the channel of the female portion to enable a fluid to act on a first end of the male portion and to deter the fluid from acting on a second end of the male portion opposite the first end, the female portion including a core defining a groove to receive a tapered protrusion of the back-up ring, in response to the fluid acting on the first end of the male portion, the male portion to outwardly urge and splay the female portion into sealing engagement with an inner surface of the cage.

12. The apparatus of claim 11, further including means for urging the male portion away from the female portion.

13. An apparatus, comprising:
    a cage;

a plug including a seal gland, wherein the plug is configured to move relative to the cage; and
a seal, including:
a male portion including a wedge-shaped protrusion of a back-up ring; and
a female portion, the female portion having a channel formed by an opening in a first end of the female portion, the male portion disposed entirely within the channel of the female portion to enable a fluid to act on a first end of the male portion and to deter the fluid from acting on a second end of the male portion opposite the first end, in response to the fluid acting on the first end of the male portion, the male portion to outwardly urge and splay the female portion into sealing engagement with an inner surface of the cage.

14. The apparatus of claim 13, wherein the female portion includes an aperture to receive the wedge-shaped protrusion.

15. The apparatus of claim 14, wherein the female portion includes a core and an annular housing, the core at least partially surrounded by the annular housing, the annular housing to deter erosion of or damage to the core.

16. The apparatus of claim 15, wherein the core includes graphite and the annular housing includes stainless steel.

17. The apparatus of claim 15, wherein surfaces of the male portion engage inner surfaces of the annular housing to at least partially guide a movement of the male portion relative to the annular housing.

18. An apparatus, comprising:
a cage;
a plug including a seal gland, wherein the plug is configured to move relative to the cage; and
a seal, including:
a male portion including a piston having a protrusion; and
a female portion including an annular housing defining a channel and a groove in the channel, the channel formed by an opening in a first end of the female portion, the piston slidably received within the channel, the male portion disposed entirely within the channel of the female portion to enable a fluid to act on a first end of the male portion and to deter the fluid from acting on a second end of the male portion opposite the first end, the protrusion received within the groove to, in response to the fluid acting on the first end of the male portion, outwardly urge splay the female portion into sealing engagement with an inner surface of the cage.

19. The apparatus of claim 18, further including a spring to urge the protrusion away from the groove.

20. The apparatus of claim 18, further including a retainer coupled to the plug, the seal confined between the retainer and a surface of the seal gland opposite the retainer.

21. The apparatus of claim 20, wherein the first end of the female portion is engaged with the retainer.

* * * * *